United States Patent [19]

Baylor

[11] 4,066,302
[45] Jan. 3, 1978

[54] TRACK JOINT WITH COMBINED THRUST AND SEAL MEMBERS

[75] Inventor: John Merlin Baylor, Bettendorf, Iowa

[73] Assignee: J. I. Case Company, Racine, Wis.

[21] Appl. No.: 729,582

[22] Filed: Oct. 4, 1976

[51] Int. Cl.² .............................................. F16J 15/34
[52] U.S. Cl. ...................................... 305/11; 277/96.1
[58] Field of Search ................. 305/11, 58 R, 58 PC, 305/14; 277/92, 96.1, 95; 308/163

[56] References Cited

U.S. PATENT DOCUMENTS

| 2,906,562 | 9/1959 | Burgman | 305/11 |
| 3,451,727 | 6/1969 | Deli et al. | 305/11 |
| 3,909,076 | 9/1975 | Kato | 305/11 |

Primary Examiner—Robert B. Reeves
Assistant Examiner—John P. Shannon
Attorney, Agent, or Firm—Arthur J. Hansmann

[57] ABSTRACT

A track joint with combined thrust and seal members and including a pin with a bushing thereon and with the track links respectively mounted on the bushing and pin. A thrust member is interposed between the one link and the bushing, and an elastic seal is held therebetween for dirt sealing at the joint.

8 Claims, 2 Drawing Figures

U.S. Patent　　　Jan. 3, 1978　　　4,066,302
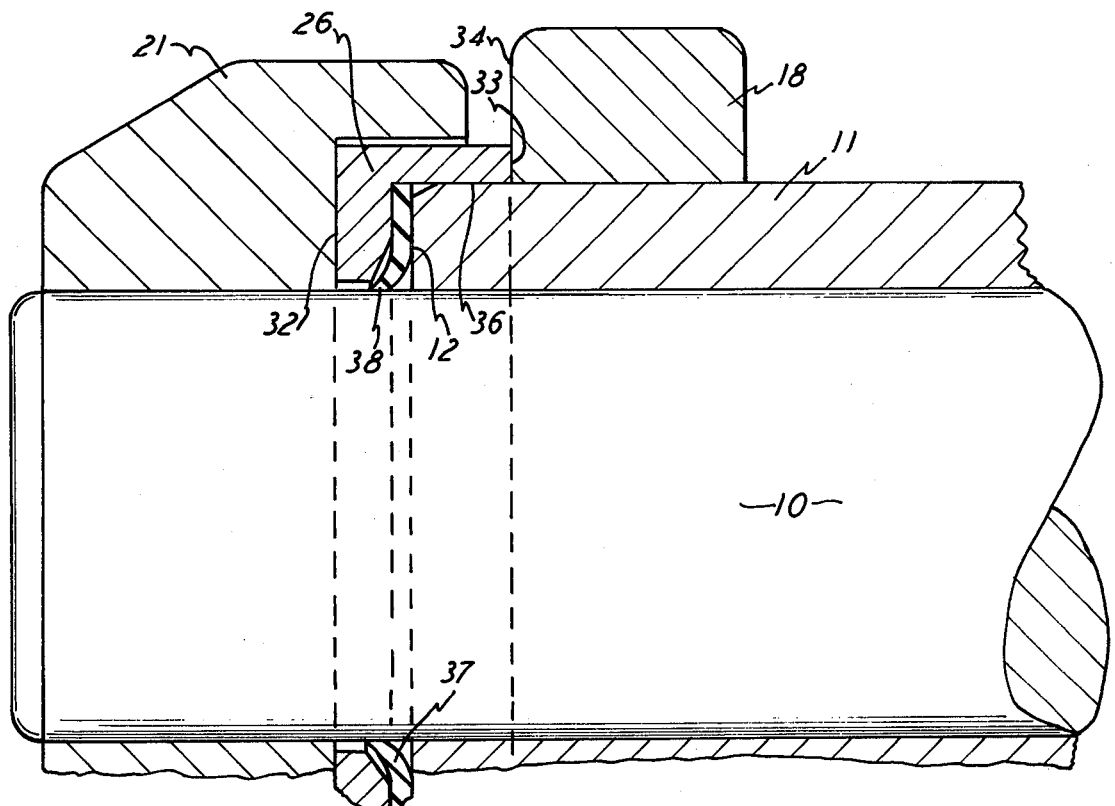
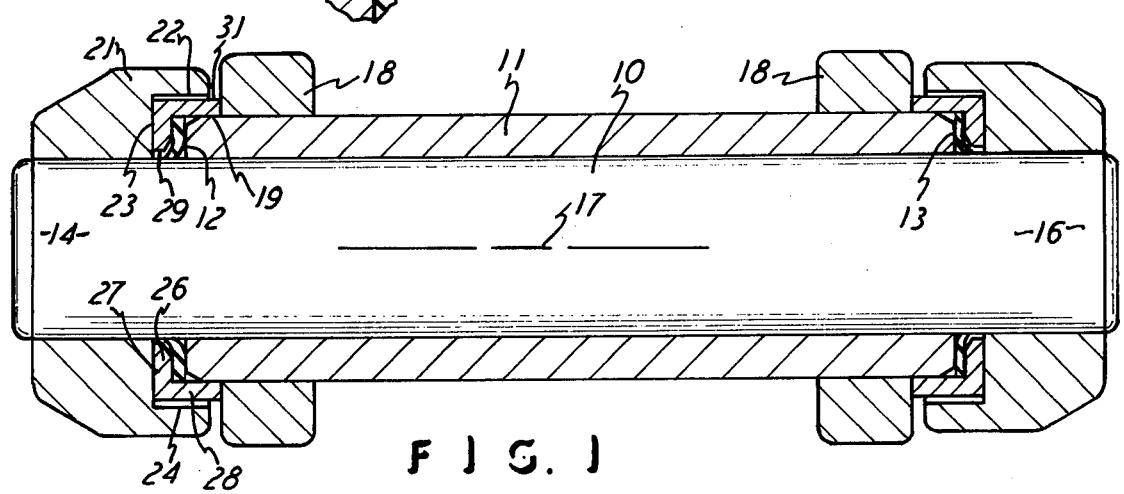

TRACK JOINT WITH COMBINED THRUST AND SEAL MEMBERS

This invention relates to a track joint with combined thrust and seal members, and the joint is utilized in the construction of a track for a crawler type of tractor.

BACKGROUND OF THE INVENTION

The prior art already has many examples of track joints for use in tracks for crawler tractors, and these joints commonly include the elements of a track pin and a bushing thereon and two track links presenting a space therebetween with some type of dirt seal disposed in the space to keep the joint free of dirt. One general example of prior art is found in my U.S. Pat. No. 3,948,574.

In the prior art track joints, it is common practice to have a thrust member interposed between the two track links which are piloted on a track pin, or between a track link and a bushing piloted on the track pin. Examples of this type of construction are found in U.S. Pat. No. 3,376,081 and 3,544,588 and 3,841,718. In these examples, the thrust bearing surface of the thrust member or ring is substantially less than the end or projected area of the bushing piloted on the pin, and thus the small area of the thrust ring bears against the link and the bushing to create undesirable high pressure and consequent wear at those locations. U.S. Pat. No. 3,347,602 shows still another example of the prior art arrangement of a small area of thrust contact between the bushing and the link, and thus there is the undesirable wear at that location.

That is, it will be understood that the track joint is an articular joint which has the links pivot relative to each other, and of course there must be bearing surfaces intermediate the links to thus maintain the links in their positions and to present a secure and firm and dirt-sealed type of joint. However, as mentioned above, the prior art fails to arrange a track joint wherein the force of the thrust between the pivotal joint members is distributed over a sufficiently large area to avoid a highly pressurized or localized area of force, and thus the prior art has the track joint vulnerable to wear and failure with regard to its mechanical and dirt-sealing intentions.

Accordingly, the present invention provides a track joint which is mechanically reliable and which performs the dirt-sealing functions, and, more specifically, the track joint of this invention provides a low mechanical pressure between the pivotal parts of the joint and relative to the thrust forces inherent in the joint.

Still further, another objective and advantage of this invention is to overcome the aforementioned deficiencies of the prior art and to accomplish the aforementioned objectives and to do so with a track joint arranged with a thrust member which transmits only a low mechanical pressure between the elements of the joint, and with the joint having a dirt-sealing effect, accomplished by both the thrust member and an elastic dirt-sealed member, to thereby retain the joint in a dirt-free condition.

Still further, it is an object and advantage of this invention to provide a track joint which accomplishes the aforementioned and which does so with a minimum of parts and with no complex but only relatively inexpensive and easily provided and maintained parts, and with the entire joint being sturdy and reliable and dirt-free and one of long life due to the low pressure of the mechanical forces acting within the joint.

Other objects and advantages will become apparent upon reading the following description in light of the accompanying drawings:

BRIEF DESCRITION OF THE DRAWINGS

FIG. 1 is a longitudinal sectional view through a track joint made according to this invention.

FIG. 2 is an enlarged view of a fragment of FIG. 1.

DETAILED DESCRIPTION OF THE PREFERRED EMBODIMENT

The drawings show the track joint of this invention, and, as mentioned herein, this track joint is utilized in the track chain of a crawler tractor and, as such, it will be readily understood by anyone skilled in the art. Thus the track joint of this invention includes a cylindrically-shaped track pin 10 which has a bushing 11 rotatable thereon and the pin extends beyond the bushing end surfaces 12 and 13 to render the bushing 11 of an axial length shorter than that of the pin 10. Thus the pin 10 has extending ends 14 and 16 which extend beyond the ends of the bushing end surfaces 12 and 13, and those surfaces are disposed on planes transverse to the longitudinal axis 17 of the pin 10. A first track link 18 is press-fitted onto the bushing 11, at both opposite ends thereof, and the extreme ends of the bushing 11 project beyond the links 18, in the bushing circular ends designated 19. Second track links 21 are press-fitted on the pin respective ends 14 and 16, and each link 21 presents a counterbore 22 faced toward the first link 18 and toward the bushing 11. With this arrangement, the bushing 11 and the two links 18 can all pivot as one unit, and the two links 21 and the pin 10 can pivot relative to that unit. Of course one skilled in the art will also understand that there are track plates (which are not shown) suitably bolted or otherwise affixed and extending across the respective pairs of links 18 and 21, and thus the links are not capable of moving axially of the pin 10, but the links can only articulate to form the pivotal joint being described herein.

The counterbore 22 in each of the links 21 includes the annularly-shaped bottom wall 23 and the circularly-shaped side wall 24. An L-shaped thrust ring 26 is disposed in the counterbore 22, and it will be seen that the ring 26 has one leg 27 and another leg 28 to form the L shape. Also, the ring of course extends completely around the pin 10 and completely around and within the counterbore 22, and the ring has an inner diameter which presents an inner circular surface 29 spaced from the circumference of the pin 10, and it has an outer diameter of an outer circular surface 31 spaced from the counterbore circular side wall 24. At this point it will also be seen and understood that the ring 26 has a thrust bearing annular surface 32 extending along the entire length of the ring leg 27, and the full surface 32 is in bearing contact with the counterbore bottom wall 23, and thus the ring bearing surface 32 is disposed on the plane transverse to the longitudinal axis 17 of the pin 10 and presents the bearing surface between the ring 26 and the joint link 21. Also, the ring 26 has a thrust bearing surface 33 which is of an annular shape and is in contact with the end surface 34 of the link 18, and thus the ring 26 and link 18 are in mechanical thrust relationship along the bearing surfaces 33.

Accordingly, the ring 26 is a thrust ring disposed intermediate the links 18 and 21 and also intermediate the bushing 11 and link 21. As such, it will be seen that the area of the end surface 12 of the bushing 11 is less than the area of the bearing surface 32 of the ring 26, and thus the ring 26 presents a larger bearing surface to the link 21, compared to the size of the bearing surface that the bushing 11 would present to the link 21 if the bushing 11 were in bearing contact with the link 21. That is, the thrust ring 26 presents a large bearing surface to the link 21, and thus the advantages of the lower mechanical pressure therebetween and the better dirt-sealing characteristics therebetween are achieved. The ring 26 may be made of a sintered metal and it could be a stamping, and, as such, the ring 26 can be press-fitted onto the outer circumference of the bushing 11 at the circular location designated 36 and that is for the length of the overlap of the ring leg or cylindrical portion 28 relative to the end of the bushing 11. With the ring 26 press-fitted onto the bushing 11, the ring 26 will of course remain in pivoted position relative to and along with the articular or pivotal motion of the bushing 11, and thus the ring 26 is part of the heretofore defined unit of the bushing 11 and the link 18. Therefore, it will be understood that the ring 26 is a thrust member extending between the links 18 and 21 and presenting the greater bearing surface 32 to the link 21, compared to the area of the bushing end 12 which might otherwise be in thrust or bearing contact with the link 21 and create undesirable high mechanical pressure therebetween and consequent wear and lack of dirt-sealing.

A ring-shaped elastomer seal member 37 is disosed between the bushing surface 12 and the thrust ring leg 27, and the member 37 may be either bonded to the ring 26 or it may be unbonded or unattached and simply held by mechanical force exerted between the thrust ring 26 and the bushisg 11. The seal member 12 has an inner circumferential lip 38 which extends into contact with the circumference of the pin 10 and thus prevents dirt from entering between the pin 10 and the bushing 11. Of course the member 37 is initially of a smaller inner diameter compared to the outer diameter of the pin 10, and thus the member 37 is pressed onto the pin 10 and is flared thereon as shown with the position of the lip 38, and thus good dirt-sealing relationship is established with the pin 10.

Accordingly, the bushing 11 and links 18 and thrust rings 26 can pivot as a unit, and the links 21 are press-fitted onto the pin 10 and pivot therewith, and the ring 26 presents a larger axial thrust area to the link 21, compared to the thrust area presented by the annular end surface of the bushing 11. Thus, any pivotal or rotary movement between the link 21 and the thrust ring 26 is on the larger bearing surface 32, compared to the bushing area or surface 12. Also, the seal member 37 precludes dirt from moving into the joint between the pin 10 and the bushing 11.

What is claimed is:

1. A track joint with combined thrust and seal members, comprising a track pin, a cylindrical bushing on said pin and having an annular end surface disposed on a plane transverse to the extent of and within the length of said pin, a first track link on said bushing, a second track link on said extending end of said pin and having a counterbore open toward said annular end surface and with a circular wall radially spaced from said pin and with an annularly-shaped bottom wall faced toward said annular end surface and with said bottom wall being of a total area larger than the total area of said annular end surface, a thrust ring disposed in said counterbore and between said annular end surface and said bottom wall and having an annular bearing surface disposed in contact with said bottom wall throughout the entire area of said annular bearing surface and with said entire area being larger than the entire area of said annular end surface, for dirt sealing between said annular bearing surface and said bottom wall and for presenting a larger axial thrust area compared to the axial thrust area presented by said annular end surface to said bottom wall, said track link on said bushing having an annular surface faced toward the end of said pin extending beyond said bushing, said thrust ring extending between and in contact with both said annular surfaces, and an elastic seal member disposed between said ring and said annular end surface for dirt sealing thereat.

2. The track joint with combined thrust and seal members as claimed in claim 1, wherein said thrust ring is L-shaped and has a cylindrical portion extending along the end of said bushing in dirt sealing contact with said bushing.

3. The track joint with combined thrust and seal members as claimed in claim 2, wherein said cylindrical portion is in pressfit relation with said end of said bushing, to be affixed thereto and transmit axial thrust force between said bushing and said track link on said pin.

4. The track joint with combined thrust and seal members as claimed in claim 3, wherein said ring is piloted on said end of said bushing and is radially spaced from said pin and said circular wall, for movement with said bushing.

5. The track joint with combined thrust and seal members as claimed in claim 4, wherein the diameter of said circular wall is larger than the external diameter of said bushing end, and said bushing end extends into said counterbore.

6. The track joint with combined thrust and seal members as claimed in claim 1, wherein said thrust ring is L-shaped and has a cylindrical portion extending along the end of said bushing and terminating in an end surface in contact with said annular surface of said track link on said bushing.

7. The track joint with combined thrust and seal members as claimed in claim 6, wherein said cylindrical portion is in pressfit relation with said end of said bushing, to be affixed thereto and transmit axial thrust force between said bushing and said track link on said pin.

8. The track joint with combined thrust and seal members as claimed in claim 7, wherein said ring is piloted on said end of said bushing and is radially spaced from said pin and said circular wall, for movement with said bushing.

* * * * *